United States Patent [19]
Wagner et al.

[11] Patent Number: 5,545,108
[45] Date of Patent: Aug. 13, 1996

[54] ARRANGEMENT AND METHOD FOR CONTROLLING AN AUTOMATIC SHIFT DEVICE OF A GEAR-CHANGE TRANSMISSION OF A MOTOR VEHICLE

[75] Inventors: Gerhard Wagner, Remseck; Rainer Wuest, Stuttgart, both of Germany

[73] Assignee: Mercedes-Benz AG, Stuttgart, Germany

[21] Appl. No.: 490,896

[22] Filed: Jun. 16, 1995

[30] Foreign Application Priority Data

Jun. 16, 1994 [DE] Germany ............... 44 20 930.4

[51] Int. Cl.[6] ............... F16H 59/10; F16H 61/18
[52] U.S. Cl. ............... 477/125; 477/134
[58] Field of Search ............... 477/125, 134

[56] References Cited

U.S. PATENT DOCUMENTS

| | | | |
|---|---|---|---|
| 4,198,882 | 4/1980 | Kiencke et al. | 477/125 |
| 4,846,022 | 7/1989 | Ito et al. | 477/125 |
| 4,922,769 | 5/1990 | Tury | 477/125 |
| 5,089,965 | 2/1992 | Braun | 477/125 |
| 5,390,117 | 2/1995 | Graf et al. | 477/125 |
| 5,416,698 | 5/1995 | Hutchison | 477/125 |

FOREIGN PATENT DOCUMENTS

| | | |
|---|---|---|
| 0602685 | 6/1994 | European Pat. Off. . |
| 1505556 | 5/1970 | Germany . |
| 2902632 | 7/1979 | Germany . |
| 3214710 | 11/1983 | Germany . |
| 3606230 | 9/1986 | Germany . |
| 4120566 | 1/1993 | Germany . |
| 4127378 | 2/1993 | Germany . |
| 2270961 | 3/1994 | United Kingdom . |
| WO93/00535 | 1/1993 | WIPO . |

OTHER PUBLICATIONS

Patent Abstract of Japan No. 2-159462, M-1020, Sep. 5, 1990, vol. 14, No. 410.
Patent Abstract of Japan No. 4-254065, M-1356, Jan. 21, 1993, vol. 17/No. 31.

*Primary Examiner*—Dirk Wright
*Attorney, Agent, or Firm*—Evenson, McKeown, Edwards & Lenahan, P.L.L.C.

[57] ABSTRACT

In an arrangement and in a method for controlling an automatic shift device of a gear-change transmission, gear shifts which are initiated by the driver via the selector device and which would result in inadmissible engine speeds are prevented and it only becomes possible to permit them again via stored shift-line characteristic diagrams.

4 Claims, 3 Drawing Sheets

ARRANGEMENT AND METHOD FOR CONTROLLING AN AUTOMATIC SHIFT DEVICE OF A GEAR-CHANGE TRANSMISSION OF A MOTOR VEHICLE

BACKGROUND AND SUMMARY OF THE INVENTION

The invention relates to an arrangement and a method for controlling an automatic shift device of a gear-change transmission of a motor vehicle.

German Patent document DE 3,214,710 C3 discloses a device for generating an electrical output signal in a control unit of a motor vehicle. The electrical output signal occurs during downshifting within the forward gears or into the reverse gear of a transmission when the manual shift lever is moved in the direction of the new gear and the driving speed in the forward direction of travel is still too high. The driving speed is recorded by an electronic speedometer. In order to afford sufficient protection against inadmissible down-shifts, to be easily adaptable to different backshift devices, and to be achieved, as required, at a very low additional outlay, provision is made in the known device for the control unit to have a logical switching stage and for an output signal to occur at the output of the logical switching stage. The output signal is for the actuation of a warning and/or blocking means. This occurs only when a first input signal derived from the driving speed is present at the first input of the logical switching stage before a second input signal which, derived from the shift-lever actuation, is present at the second input. The German Patent document DE 3,214,710 C3 indicates that the use of this known device in conjunction with a blocking means is also expedient in an automatic transmission.

German Patent document DE 4,120,566 A1 discloses a method for controlling a preferably electrohydraulically actuated automatic-shift transmission of a motor vehicle equipped particularly with an internal-combustion engine. The internal-combustion engine is capable of being influenced by a power-control member, preferably an accelerator pedal or a throttle flap. Gear steps of the transmission are shifted automatically via shift characteristic diagrams at least in dependence on the throttle-flap position, on the driving speed and on the engine speed. Upshifts (reduction in the transmission ratio) are prevented as long as the upshift-prevention state is active. The upshift-prevention state changes to the active state when a time change in the throttle-flap position falls below a negative limit value and the overrun mode is recognized. The upshift-prevention state changes to the inactive state after the expiry of a first timespan when the traction mode is recognized.

In order to improve the shift behavior before bends in the road and during braking, provision is made, in the known method, in the event that the overrun mode is recognized again during the expiry of the first timespan, for the upshift prevention to remain in the active state until the traction mode is recognized once more and a second timespan has elapsed. In this known method, provision is also made, preferably as a result of the active upshift prevention, for stepped downshifts to become possible. However, the stepped downshift takes place only when:

1) a service brake of the motor vehicle is actuated, or, alternatively thereto or in addition, the time change in the driving speed is lower than a first negative longitudinal-acceleration limit value,
2) the transverse acceleration recorded by the transverse-acceleration sensor is below a first transverse-acceleration limit line,
3) the time change in the driving speed is higher than a second negative longitudinal-acceleration limit value, and
4) the driving speed is lower than a driving-speed limit value.

The downshift takes place by one gear step in each case, at least one fourth timespan being located between two shifts. The stepped downshift is carried out up to that gear step which is admissible at the instantaneous operating point of the motor vehicle in the instantaneously set shift characteristic diagram.

Vehicles with automatic transmissions have, as a rule, a selector lever with a gate shift. In addition to the four main driving steps P, R, N and D, the shift gates conventionally have further gear steps which make it possible to block gears. Consequently, downshifts can be initiated by the driver and upshifting can be prevented. However, the possibility of manual action also entails the risk of faulty operation. Overspeeds can occur as a result of downshifts in the upper engine-speed range. This results in damage to the engine.

Faulty operations can be prevented by mechanically/hydraulically blocking the selector lever against downshifting in inadmissible driving-speed or engine-speed ranges. This is a solution which is complicated and sensitive to tolerances. In the case of electronically controlled transmissions, manual selector-lever downshifting could be allowed, but downshifting cannot be executed in the inadmissible engine-speed range. Downshifting then takes place only when the engine speed falls below the maximum downshift engine speed or driving speed at which engine overspeeding no longer occurs. The disadvantage of this solution is that the driver could not or could only poorly comprehend the shift behavior of the transmission. The transmission does not shift when shifting is initiated. At a decreasing speed, the transmission shifts down very abruptly at its highest engine-speed limit in a completely unmotivated way at a later time. Since the output torque and therefore the wheel force are increased by the amount of the gear jump of the multi-step transmission as a result of the downshift, this can lead to dangerous driving states in critical driving situations, such as, for example, on road bends or when the road surface is slippery.

There is therefore needed, for electronically controlled automatic transmissions, a method which allows the downshift block to function in a simple manner and which, at the same time, rules out the disadvantages mentioned above.

These needs are met according to the present invention by an arrangement and a method for controlling an automatic shift device of a gear-change transmission of a motor vehicle. A selector device is connected to the shift device by a manual selection member. An electronic control unit transmits a gear-shift signal to the shift device in dependence on a stored shift-line characteristic diagram in each case, by the processing of input signals which contain significant information relating to the respective position of the manual selection member, the transmission output speed, the engine load and the current gear. A first device checks whether the position of the manual selection member limits the upshift into a gear which is lower than the current gear. A second device forms a reference signal either identical to the position of the manual selection member or identical to the current gear. A third device checks whether the reference signal corresponds to a gear which is lower than the current gear. A storage stage contains at least one stored shift-line characteristic diagram. A computing stage checks whether, at the current driving speed, after a gear shift the engine speed would reach a value higher than a maximum value. A change-over stage can be changed over between a first switching state, in which its input is connected to one of its two outputs and a second switching state, in which its input is connected to its other output. At least one shift stage triggers the gear-shift signal. One output of the first device for checking the position of the manual selection member is connected both to a control input for setting the reference signal to the position of the manual selection member of the second device for forming the reference signal and to a control input of the change-over stage for changing over to the first switching state and to one input of the storage stage. Another output of the first device for checking the position of the manual selection member is connected to one input of the third device for checking the reference signal. One output of the third device for checking the reference signal and one output of the computing stage as well as the output of the storage stage are connected to a shift stage, if appropriate in each case to a shift stage. Another output of the third device for checking the reference signal is connected to the input of the change-over stage. The output of the change-over stage which is connected to the input of the change-over stage in the first switching state is connected to one input of the computing stage. The other output of the change-over stage is connected to the input of the storage stage. Another output of the computing stage is connected both to a control input of the change-over stage for changing over the latter into the second switching state and to a control input of the second device for forming the reference signal. The control input is used to set the reference signal to the value of the current gear.

According to the present invention, an engine, a gear-change transmission with electronic control, and a selector lever, the individual shift positions of which are sensed electrically, are used. If appropriate, the sensing of the shift positions can also take place in the transmission on a notched plate. The electronic transmission control has inputs for the selector-lever signal, the engine speed and the transmission output speed and/or the driving speed. Provided in the electronic transmission control is a shift program which, on the basis of the operating conditions, evaluates a shift-line characteristic diagram and which thereby executes automatic upshifts and downshifts in dependence on various parameters. By means of this selector-lever signal, upshifts can be suppressed and downshifts initiated.

In the method according to the present invention, after the engine speed or driving speed has fallen below its maximum admissible limit value, downshifting does not take place, but instead the evaluation of the shift-line characteristic diagram is initiated. As a result, no unmotivated downshift cab occur, but the transmission shifts down in dependence on the driving conditions according to the predetermined shift points. Consequently, after an inadmissible selector-lever downshift, there is no possibility that the vehicle can assume dangerous states in critical driving situations.

The essential advantages of the present invention are described in the following.

The driver would like to initiate a downshift in the transmission via the selector lever. If the speed of the vehicle is higher than the maximum admissible speed of the gear to be selected, this downshift would lead to inadmissibly high engine speeds and consequently to damage to the engine and/or transmission. According to the present invention, therefore, this shift is blocked. In this state, the selector-lever position and the selected gear step are no longer correctly related. The selector lever indicates a lower gear step than that selected in the transmission. The method according to the invention ensures that the correct relationship between the selector lever and transmission is restored so that the vehicle does not encounter any critical driving situation. For this purpose, according to the invention, a downshift may take place only at the downshift line at which the gear selected by the selector lever is entered, since the moment from which downshifting can be allowed again and the moment when the selector lever is actuated can be markedly different from one another.

This method differs from the state of the art, since, in the known instance, although a selector-lever shift is likewise prevented, as described above, nevertheless the downshift into the blocked gear is already allowed again when the driving speed falls below a limit at which the engine reaches its maximum admissible speed. This can lead to dangerous driving situations, in which the driver loses control of his vehicle.

In the known method of German Patent document DE 4,120,566 A1 described above, downshifts are stopped when a rapid easing of the accelerator pedal and additional criteria, such as, for example, transverse acceleration, are recognized. These are downshifts which, without these criteria, would be permitted according to the set shift characteristic diagram. They are stopped in order to maintain the driving stability of the vehicle. The downshifts are permitted again when the following criteria are satisfied: 1) when the brake is actuated or negative acceleration is recognized, 2) when the transverse acceleration falls below an appropriate value, 3) when the vehicle speed is lower than an appropriate value, and 4) when positive acceleration is recognized.

A downshift by only one gear step is permitted in each case. If, according to the shift characteristic diagram, downshifts by more than one gear step are allowed, a time meter is started. Only after the expiry of the time meter can a further downshift be initiated.

In contrast to this, according to the present invention, a selector-lever downshift leading to inadmissibly high engine speeds is prevented. Shifts via the shift characteristic diagram are not permissible in this range. They are permitted again only in dependence on the shift characteristic diagram, not on additional other criteria, such as transverse acceleration, brake actuation or the like. If, according to the shift characteristic diagram, downshifts over one or more gears are permissible, these are executed immediately and without the use of corresponding time meters. The time criterion does not in any way also have to be processed in the present invention, it would make it impossible for the driver to comprehend that downshifting is permitted again.

The invention consequently differs from the state of the art both in respect of the initiating criterion and the processed signals for permitting downshifting again, and also in respect of the shift sequence of the downshifts permitted again.

It is an advantage of the present invention to check and, if appropriate, permit a downshift by more than one gear instead of stepped downshifts, when the position of the manual selector lever necessitates per se such a downshift in relation to the current gear.

Other objects, advantages and novel features of the present invention will become apparent from the following detailed description of the invention when considered in conjunction with the accompanying drawings.

DETAILED DESCRIPTION OF THE DRAWINGS

Figure 1:
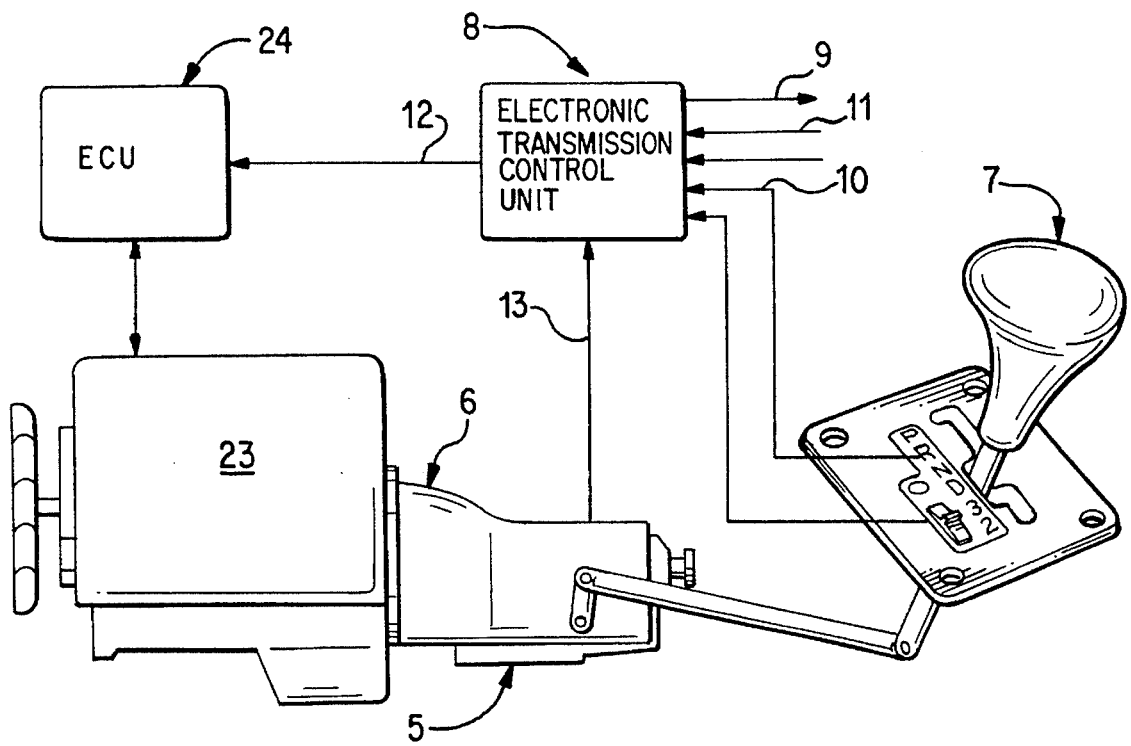
FIG. 1 is a schematic diagram of the components of a motor vehicle which are essential for the present invention.

A motor vehicle is driven by an engine 23, the power of which is controlled in a conventional manner by an electronic engine control unit 24. The engine 23 is followed in the force flux by a four-step gear-change transmission 6 which is shifted automatically in a conventional manner way by an electrohydraulic shift device 5, on which action can be taken in a conventional manner by a driver-actuable manual selector lever 7 of a selector device. The manual selector lever 7 can be actuated by means of a selection gate into the conventional positions P-R-N-D-3-2, of which, in a known manner, the position "3" is used for blocking the fourth forward gear and the position "2" for blocking the third and the fourth forward gear, manual downshifts thereby becoming possible.

Figure 2:
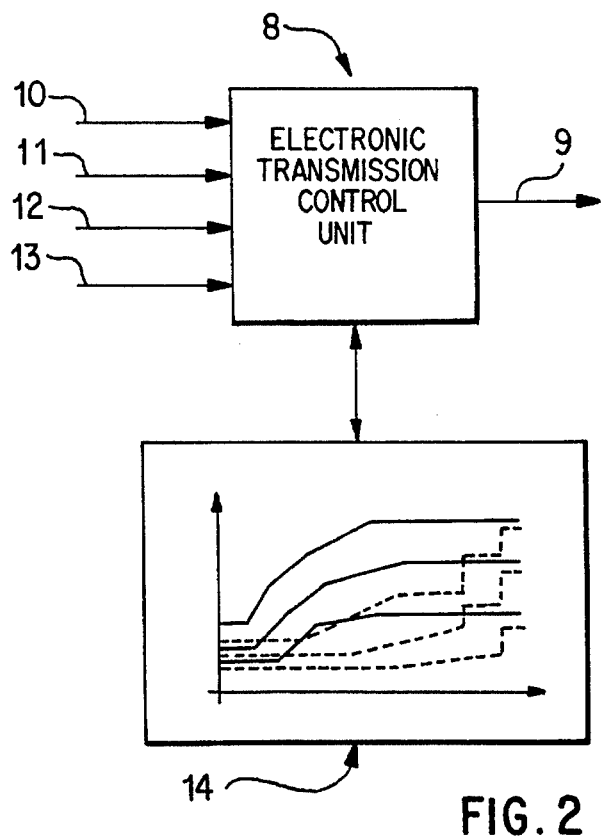
FIG. 2 is a block diagram example of a shift program of the electronic transmission control of FIG. 1.

The shift device 5 is controlled by an electronic transmission control unit 8 which processes input signals 10 to 13 as information at least relating to the position of the manual selector lever 7, the instantaneous transmission output speed and/or the driving speed, the engine load and/or the power requirement by the driver and relating to the current selected gear, for the evaluation of stored shift-line characteristic diagrams 14 (FIG. 2). In dependence on these shift programs, the transmission control unit 8 triggers a respective output signal 9 for the new gear to be shifted.

Figure 3:
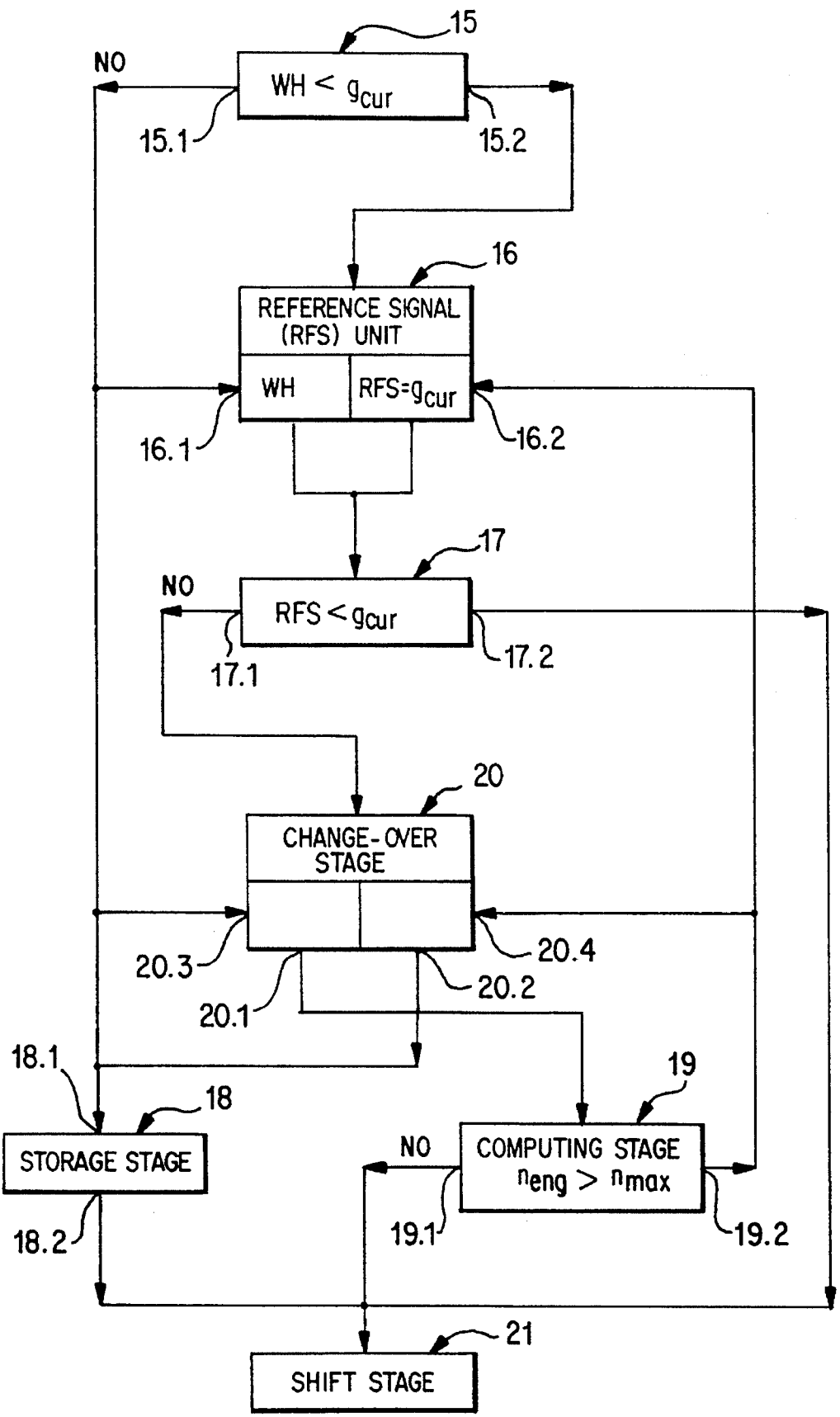
FIG. 3 is a flow chart according to the invention integrated in the electronic transmission control of FIG. 1.

The control unit 8 comprises, inter alia, an arrangement according to FIG. 3 with a first device 15 for checking whether the position WH of the manual selector lever 7 corresponds in the forward driving range to a gear which is lower than the current gear $g_{-cur}$, with a second device 16 for forming a reference signal RFS either equal to the position WH of the manual selector lever 7 or equal to the current gear $g_{-cur}$, and with a third device 17 for checking whether the reference signal RFS is lower than the current gear $g_{-cur}$. The control unit 8 further includes a change-over stage 20 which can be changed over between a first switching state, in which its input is connected to one (20-1) of its two outputs 20-1 and 20-2, and a second switching state, in which its input is connected to its other output 20-2. A storage stage 18 contains shift-line characteristic diagrams 14. A computing stage 19 computes and checks whether the engine speed associated with the new gear to be shifted is higher than an admissible maximum value. At least one shift stage 21 for triggering the output signal 9 for the new gear to be shifted is provided in the control unit 8.

This arrangement is also interlinked so that one output 15-1 of the first device 15 is connected both to one control input 16-1 of the second device 16 and to one control input 20-3 of the change-over stage 20, as well as to one input 18-1 of the storage stage 18. Whilst a first output 19-1 of the computing stage 19 is connected to the shift stage 21, a second output 19-2 of the computing stage 19 is connected both to one control input 16-2 of the second device 16 and to a second control input 20-4 of the change-over stage 20. A second output 15-2 of the first device 15 is connected, preferably via the second device 16, to one input of the third device 17 which is itself connected via a first output 17-1 to the input of the change-over stage 20 and via a second output 17-2 to the shift stage 21. The change-over stage 20 is connected by means of its one output 20-1 to an input of the computing stage 19 and by means of its other output 20-2 to the input 18-1 of the storage stage 18 which is likewise connected via its output 18-2 to the shift stage 21.

The operating mode of the arrangement of FIG. 3 is as follows. In a first method step, a check is made by means of the first device 15 as to whether the gear which is associated with the selector-lever position WH in the forward driving range, and from which upshifts are blocked, is lower than the current gear $g_{-cur}$.

In a second method step which follows the first method step when the gear associated with the position WH of the selector lever 7 is not lower than the current gear $g_{-cur}$, via a signal at the output 15-1 of the first device 15, both the reference signal RFS in the device 16 is set via the control input 16-1 of the latter to a value corresponding to the position WH of the manual selector lever 7, the change-over stage 20 is changed over to its first switching state, in which its input is connected via the corresponding output 20-1 to the computing stage 19, and the storage stage 18 is activated.

In a third method step which follows the second method step if appropriate, that is to say in the event of a relevant displacement of the operating point of the vehicle in the shift-line characteristic diagram, the storage stage 18 emits at its output 18-2 an output signal $g_{-SL}$ for the new gear to be shifted according to the characteristic diagram. The output signal is applied to the shift stage 21.

In an alternative second method step which, alternatively to the second method step, follows the first method step when the gear which is associated with the position WH of the manual selector lever 7 and from which upshifts are prevented is lower than the current gear $g_{-cur}$ a check is made by means of the device 17 as to whether the gear corresponding to the reference signal RFS is lower than the current gear $G_{-cur}$.

In a fourth method step which follows the alternative second method step when the gear corresponding to the reference signal RFS is lower than the current gear $g_{-cur}$, a signal appearing at the output 17-2 of the third device 17 is applied to the shift stage 21, so that the shift stage 21 triggers a shift signal 9 (FIGS. 1 and 2) for shifting the new gear.

In a fifth method step which, alternatively to the fourth method step, follows the alternative second method step when the gear corresponding to the reference signal RFS is not lower than the current gear, the other output 17-1 of the third device 17 is connected to the input of the computing stage 19 via the change-over stage 20 when the latter is in its first switching state.

In a sixth method step which follows the fifth method step, a check is made in the computing stage 19 as to whether the engine speed $n_{-eng}$ will be higher than a maximum value $n_{-eng}$ in the new gear to be shifted.

In a seventh method step which follows the sixth method step when the engine speed $n_{-eng}$ would not be higher than the maximum value $n_{-max}$, an output signal at one output 19-1 of the computing stage 19 is applied to the shift stage 21, so that a shift signal 9 for shifting the new gear is triggered.

In an eighth method step which, alternatively to the seventh method step, follows the sixth method step when the engine speed $n_{-eng}$ of the new gear would be higher than the maximum value $n_{-max}$, via a signal at the other output 19-2 of the computing stage 19 both the change-over stage 20 is changed over to its second switching state, in which its input is connected to its output 20-2 connected to the storage stage 18, and, in the second device 16, the reference signal RFS is set to the value corresponding to the current gear $g_{-cur}$.

In an alternative fifth method step which, alternatively to the fifth method step, follows the alternative second method step when the gear corresponding to the reference signal RFS is not lower than the current gear $g_{-cur}$ and the change-over stage 20 is changed over to its second switching state, in which its input is connected to its output 20-2 connected to the storage stage 18, the storage stage 18 is activated by a signal at the output 17-1 of the third device 17.

In a ninth method step which follows the alternative fifth method step if appropriate, that is to say when the operating point of the vehicle is displaced correspondingly in the shift-line characteristic diagram 14, the storage stage 18 emits at its output 18-2 an output signal g-SL which is dependent on the characteristic diagram and which, by being applied to the shift stage 21, triggers a shift signal 9 for shifting the new gear.

Figure 4:
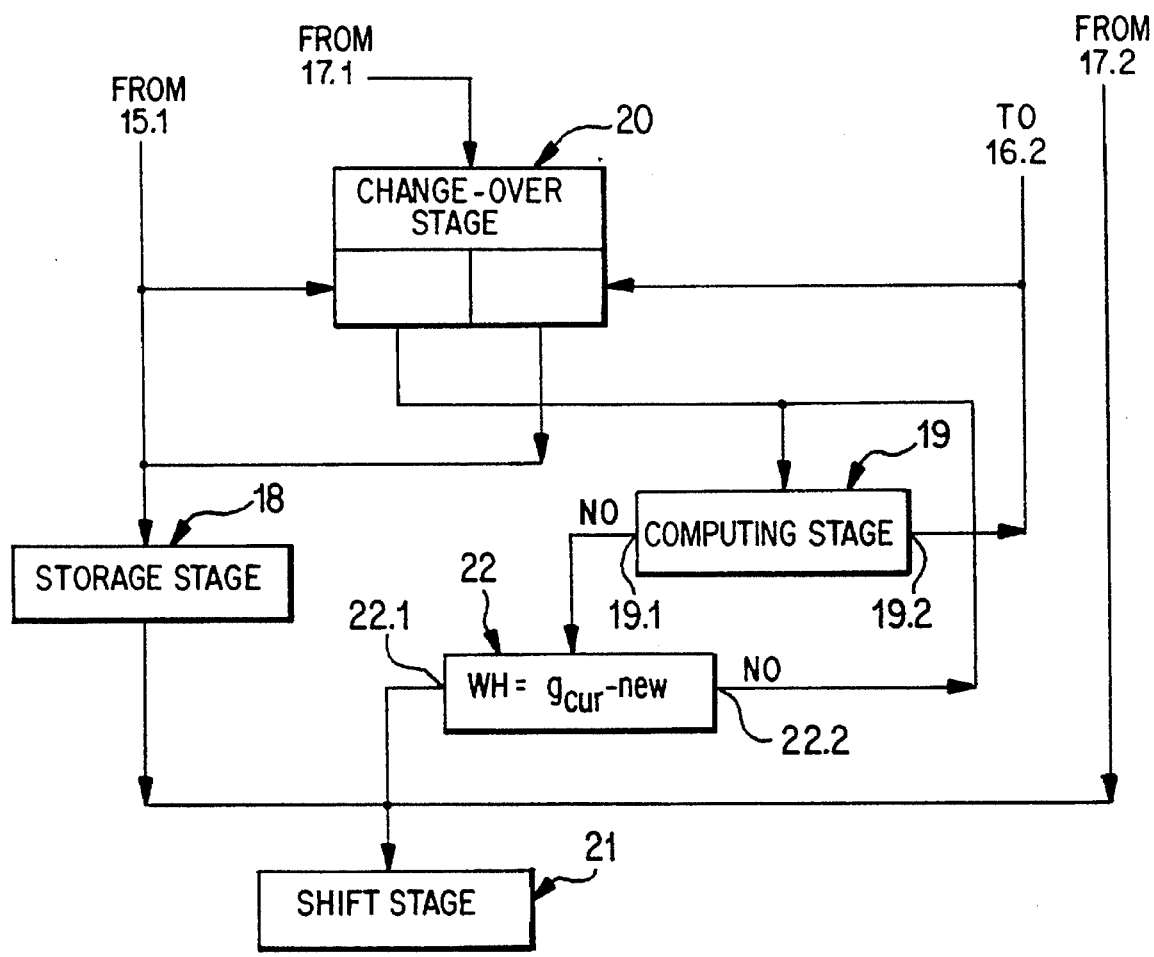
FIG. 4 is a flow chart of an alternative embodiment of the flow chart of FIG. 3.

Referring to FIG. 4, this embodiment of the arrangement according to the invention differs from the arrangement according to FIG. 3 only in that the output 19-1 of the computing stage 19 is not connected directly to the shift stage 21, but via a fourth device 22, in which a check is made as to whether the gear corresponding to the position WH of the manual selector lever 7 in the forward driving range is identical to the new gear $g_{-cur}$-n to be shifted. The fourth device 22 is connected via its input to the output 19-1 of the computing stage 19 and via its one output 22-1 to the shift stage 21 as well as via its other output 22-2 to the input of the computing stage 19. The embodiment according to FIG. 4 is otherwise identical to the arrangement of FIG. 3. The operating mode of the embodiment according to FIG. 4 is as follows. The seventh method step in the operating mode of the arrangement of FIG. 3 is replaced if the engine speed $n_{-eng}$ of the new gear reduced relative to the current gear by one gear step were to exceed the maximum value $n_{-max}$. In its place, a tenth method step is provided in which a check is made by the fourth device 22 as to whether the gear corresponding to the position WH is identical to the new gear to be shifted.

In an eleventh method step which follows the tenth method step when the gear corresponding to the position WH of the manual selector lever 7 is identical to the new gear to be shifted, a signal at the output 22-1 of the fourth device 22 is applied to the shift stage 21 in order to trigger a gear-shift signal 9.

In a twelfth method step which, alternatively to the eleventh method step, follows the tenth method step when the gear corresponding to the position of the manual selector lever 7 is not identical to the new gear $g_{-cur}$-n to be shifted, the computing stage 19 is induced, via a signal at the other output 22-2 of the fourth device 22, to compute the engine speed $n_{-eng}$ of the next lower gear and thereupon to check whether the maximum value $n_{-max}$ would or would not be exceeded.

The twelfth method step is then followed either by the above-described eighth method step of the operating mode of the arrangement of FIG. 3 or repeatedly by the above-described tenth method step until the new gear to be shifted is identical to the gear corresponding to the position of the manual selector lever 7.

The following example assumes a transmission state in which the manual selector lever 7 of the gear-change transmission 6 having five forward gears is in the position WH="4" and the third gear is the stationary current gear $g_{-cur}$.

The first check by the first device 15 consequently indicates that the gear "4" corresponding to the position of the manual selector lever 7 is higher than the current gear (=3). As a result, the storage stage 18 is activated, the reference signal RFS in the device 16 is set to the value "4" and the change-over stage 20 is switched into its first switching state, in which its input is connected to the computing stage 19. In the assumed example, the evaluation of the shift-line characteristic diagram 14 by means of the storage stage 18 would give an output signal $g_{-SL}$ for shifting the second gear which is applied to the shift stage 21, so that the latter emits a relevant gear-shift signal 9.

For an immediately subsequent transmission state, therefore, the second gear becomes the current gear, and it is now assumed for this transmission state that the manual selector lever 7 would be in the position "1" corresponding to the first gear.

A first check by means of the first device 15 indicates that the gear "1" corresponding to the position of the manual selector lever 7 is lower than the current gear (=2).

In a subsequent interrogation by means of the third device 17, a check is made as to whether the reference signal RFS is lower than the current gear. In the preceding transmission state, the reference signal RFS was set to the value "4", so that, in this subsequent instance, the reference signal "4" is higher than the current gear (=2).

Consequently, since the change-over stage 20 is still in the second switching state which was switched in the preceding transmission state and in which its input is connected to the computing stage 19, the engine speed of the next lower gear is now checked in the computing stage 19 as to whether the admissible maximum value is exceeded. In the assumed instance, the maximum value is exceeded, and therefore a gear shift does not take place, but, in the second device 16, the reference signal RFS is set to the value "two" of the current gear and the change-over stage 20 is switched into its second switching state, in which its input is connected to the storage stage 18.

In the next following cycle, once again an interrogation is first carried out in the first device 15 as to whether the gear (=1) corresponding to the position of the manual selector lever 7 is lower than the current gear (=2).

Since this is so, in a next step an interrogation is carried out, by means of the third device 17, as to whether the reference signal RFS is lower than the current gear (=2). Since, in the preceding cycle, the reference signal was set to the value "2" and is therefore now not lower than the current gear, and since the change-over stage 20 is now in its second switching state, the storage stage 18 is activated. In the assumed instance, the operating point of the vehicle is displaced in the shift-line characteristic diagram 14, so that the storage stage 18 emits an first gear, which order to trigger a output signal $g_{-SL}$ for shifting the is applied to the shift stage 21 in corresponding gear-shift signal 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling an automatic shift device of a gear-change transmission of a motor vehicle, comprising:

a selector device connected to the shift device by a manual selection member;

an electronic control unit which receives and processes input signals containing information with respect to a position of the manual selection member, a transmission output speed, an engine load, and a current gear, said electronic control unit transmitting a gear-shift signal to the automatic shift device in each case as a function of stored shift-line characteristic diagrams;

a first device which checks whether the position of the manual selection member limits an upshift into a gear which is lower than the current gear;

a second device which forms a reference signal which is either identical to said position of the manual selection member or said current gear;

a third device which checks whether the reference signal corresponds to a gear which is lower than the current gear;

a storage stage which stores at least one of the shift-line characteristic diagrams;

a computing stage which checks, at a current driving speed, after a gear shift whether the engine speed would reach a value higher than a maximum value;

a change-over stage which is changeable between a first switching state, in which its input is connected to one of its two outputs, and a second switching state, in which its input is connected to its other output;

at least one shift stage for triggering the gear-shift signal;

wherein one output of the first device is connected both to a control input for setting the reference signal to the position of the manual selection member of the second device and to a control input of the change-over stage for changing over to the first switching state, as well as to one input of the storage stage;

wherein another output of the first device is connected to one input of the third device;

wherein one output of the third device and one output of the computing stage, as well as an output of the storage stage are connected to a shift stage and, if appropriate, in each case to the shift stage;

wherein another output of the third device is connected to an input of the change-over stage, said output of the change-over stage, which is connected to an input of the change-over stage in the first switching state, is connected to one input of the computing stage, the other output of the change-over stage is connected to the input of the storage stage; and wherein another output of the computing stage is connected both to a control input of the change-over stage for changing over the latter into the second switching state and to a control input of the second device, the control input being used to set the reference signal to the value of the current gear.

2. An arrangement according to claim 1, further comprising a fourth device for checking whether a new gear to be shifted is identical to that gear which corresponds to the position of the manual selection member, and in which, of the fourth device, an input is connected to the output of the computing stage assigned to the shift stage for the gear-shift signal, and a first output is connected to the shift stage and to a second output to the input of the computing stage.

3. A method for use with an arrangement for controlling an automatic shift device of a gear-change transmission of a motor vehicle, including a selector device connected to the shift device by a manual selection member; an electronic control unit which receives and processes input signals containing information with respect to a position of the manual selection member, a transmission output speed, an engine load, and a current gear, said electronic control unit transmitting a gear-shift signal to the automatic shift device in each case as a function stored shift-line characteristic diagrams; a first device which checks whether the position of the manual selection member limits an upshift into a gear which is lower than the current gear; a second device which forms a reference signal which is either identical to said position of the manual selection member or said current gear; a third device which checks whether the reference signal corresponds to a gear which is lower than the current gear; a storage stage which stores at least one of the shift-line characteristic diagrams; a computing stage which checks, at a current driving speed, after a gear shift whether the engine speed would reach a value higher than a maximum value; a change-over stage which is changeable between a first switching state, in which its input is connected to one of its two outputs, and a second switching state, in which its input is connected to its other output; at least one shift stage for triggering the gear-shift signal; wherein one output of the first device is connected both to a control input for setting the reference signal to the position of the manual selection member of the second device and to a control input of the change-over stage for changing over to the first switching state, as well as to one input of the storage stage; wherein another output of the first device is connected to one input of the third device; wherein one output of the third device and one output of the computing stage, as well as an output of the storage stage are connected to a shift stage and, if appropriate, in each case to the shift stage; wherein another output of the third device is connected to an input of the change-over stage, said output of the change-over stage, which is connected to an input of the change-over stage in the first switching state, is connected to one input of the computing stage, the other output of the change-over stage is connected to the input of the storage stage; and wherein another output of the computing stage is connected both to a control input of the change-over stage for changing over the latter into the second switching state and to a control input of the second device, the control input being used to set the reference signal to the value of the current gear, the method comprising the steps of:

in a first step, a check is made, by the first device, as to whether the position of the manual selection member is lower than the current gear;

in a second step, if the position is not lower than the current gear, setting the reference signal in the second device to the position, switching the change over stage into the first switching state, in which its input is connected to its output connected to the computing stage, and activating the storage stage for the evaluation of shift lines;

alternatively in a second method step, when the position is lower than the current gear, another output of the first device is connected to one input of the third device for checking the reference signal;

if appropriate in a third step following the second step, an output signal of the storage stage is applied to a shift stage for a gear-shift signal;

in a fourth step following the alternative second step, if the reference signal is lower than the current gear, a shift stage is induced to trigger a gear-shift signal;

in a fifth step alternatively to the fourth step which follows the alternative second step when the reference signal is not lower than the current gear, another output of the third device is connected to the computing stage via the change-over stage when the change-over stage is in its first switching state;

in a sixth step following the fifth step, an engine speed is computed and checked by the computing stage;

in a seventh step following the sixth step, if the engine speed is not higher than a maximum value, a shift stage is induced to trigger a gear-shift signal via an output signal from an associated output of the computing stage;

in an eighth step alternatively to the seventh step, when the engine speed is higher than a maximum value, via an output signal at another output of the computing stage, both the change-over stage is changed over to its second switching state, in which its input is connected to its output connected to the storage stage, and in the second device for forming the reference signal, the reference signal is set to the current gear;

in an alternative fifth step following the alternative second step, the other output of the third device is connected to the storage stage via the change-over stage when the change-over stage is in its second switching state; and if appropriate in a ninth step following the alternative fifth step, an associated shift stage is induced to trigger a gear-shift signal via an output signal from the storage stage.

4. A method according to claim 3 wherein a fourth device for checking whether the new gear to be shifted is identical to the gear corresponding to the position of the manual selection member, and wherein the fourth device has one input connected to the output of the computing stage assigned to the shift stage for the gear-shift signal and a first output connected to this shift stage and a second output connected to the input of the computing stage, the method further comprising the steps of:

in a tenth step alternative to the seventh step for when the engine speed is not higher than a maximum value, the fourth device for checking the new gear to be shifted is activated;

in an eleventh step for when there is identity between the new gear and the gear corresponding to the position of the manual selection member, an associated shift stage is induced to trigger a gear-shift signal via an output signal at the associated one output of the fourth device;

in a twelfth step alternatively to the eleventh step, for when there is no identity between the new gear and the gear corresponding to the position of the manual selection member, the computing stage is activated via the other output of the fourth device to compute the engine speed associated with the next lower gear; and if appropriate, the sixth, tenth and twelfth steps are repeated until there is an identity between the new gear and the gear corresponding to the position of the manual selection member.

* * * * *